United States Patent [19]

Morvan

[11] Patent Number: 5,598,312
[45] Date of Patent: Jan. 28, 1997

[54] DEVICE FOR CONTROLLING A MECHANISM DRIVEN BY A LENS ONE ELECTRIC MOTOR

[75] Inventor: Roger Morvan, Gratentour, France

[73] Assignee: Aerospatiale Societe Nationale Industrielle, Paris, France

[21] Appl. No.: 248,952

[22] Filed: May 25, 1994

[30] Foreign Application Priority Data

Jun. 1, 1993 [FR] France .................................. 93 06513

[51] Int. Cl.$^6$ ............................................... H02H 5/04
[52] U.S. Cl. ................................ 361/31; 361/85; 361/28; 318/453
[58] Field of Search ..................... 361/23, 28–31, 361/93–94, 85, 87; 318/101–103, 471, 479, 456, 434, 452–453, 455, 466; 417/279

[56] References Cited

U.S. PATENT DOCUMENTS 3,919,600  11/1975  Sons .
4,771,356  9/1988  Hastings ........................................ 361/59
5,222,009  6/1993  Scharnick et al. ............................. 361/28

Primary Examiner—Jeffrey A. Gaffin
Assistant Examiner—Michael J. Sherry
Attorney, Agent, or Firm—Michael N. Meller

[57] ABSTRACT

The invention relates to a device for controlling a mechanism driven by at least one electric motor (11, 12), said device comprising a circuit (20, 38) for detecting the power consumption of the mechanism and for comparing the detected value with at least one current threshold, with confirmation during a defined time and a circuit (54) for controlling the stopping of the mechanism for a given time, as a function of the result of said comparison.

Application more particularly to the field of high-capacity or wide-body aircraft, for the generation of pressure in their hydraulic circuits.

12 Claims, 2 Drawing Sheets

DEVICE FOR CONTROLLING A MECHANISM DRIVEN BY A LENS ONE ELECTRIC MOTOR

TECHNICAL FIELD

The present invention relates to a device for controlling a mechanism, e.g. an electric pump, driven by at least one electric motor.

The invention has an advantageous application in the field of wide-body or high-capacity aircraft for generating pressure in their hydraulic circuits.

PRIOR ART

Wide-body aircraft are equipped with hydraulic circuits, whose pressure is generated either by pumps driven by the main engines of the aircraft, or by electric pumps. Such electric pumps are connected to the aircraft power supply. Therefore they are subject to supply micro-cutouts or transients during electric transfers, e.g. stopping of an engine and switching to the electrical generator of another engine.

In general, electric pumps are adequately dimensioned and have a starting torque which prevents them from suffering unsatisfactory operation due to transients.

A new electric pump generation for aircraft comprises two three-phase motors connected in opposition to one another on the same shaft, each of these motors being coupled to a drum, which receives a group of pistons, a single inclined plate positioned between two rotary drums bringing about the displacement of the pistons. This new technology offers a considerable weight gain, to which can be added other advantageous improvements. However, there is a problem of poor a starting due to supply transients. Thus, for example, electric pumps for installation on wide-body aircraft, which belong to this new generation, suffer from unsatisfactory operation due to electric power supply transients of their power circuit or their control circuit. This poor operation leads to the loss of the function allocated to such an electric pump as a result of the tripping of the corresponding circuit-breaker.

These novel electric pumps, which have a certain number of important advantages particularly with respect to the weight and overall dimensions, consequently suffer from a serious disadvantage in the presence of transients lasting about 100 ms. These transients occur relatively frequently on an aircraft, but all the airborne systems are designed so as to withstand without difficulty such electric power supply deficiencies. Such electric pumps do not behave correctly in the case of such transients. Thus, these transients are both too long to permit both electric motors driving the electric pump to retain sufficient speed to be able to supply an adequate torque as soon as the power supply is reestablished and too short for the counterpressure opposed by the hydraulic consumption means to have dropped sufficiently by internal leaks to enable the torque to be supplied by the electric motors to have dropped to a relatively low value so as to permit the restarting thereof.

Thus, in the case of transients below e.g. 16 ms, the electric pump rotation conditions remain sufficiently high as a result of the inertia of the moving parts for the motor to retain a high torque, thus avoiding the problem in question. In the case of transients e.g. exceeding 200 ms, the internal leaks of the electric pump and the circuit will lead to a sufficient pressure drop and will consequently not produce the opposing torque able to oppose the correct restarting of the electric pump when the supply voltage is again present. Thus, as a result of a transient between e.g. 16 and 200 ms, the electric pump does not restart correctly. In this configuration, the electric pump rotation conditions are below those which would make it possible to overcome the opposing torque opposed to it by the pressure/flow rate of the supplied circuit. The internal leaks do not have time to bring about a drop in the pressure and their flow rate remains high. The corresponding opposing torque remains above the motor torque, thus preventing the electric pump from rising to normal operating conditions. Therefore the new generation electric pumps are unable to withstand power supply transients.

The emergency supply function which can be allocated to such electric pumps cannot be guaranteed due to the possible existence of transients.

A persistent overconsumption having a mechanical, hydraulic or electric origin, or due to an excessive use temperature due to numerous successive starts or for any other reason, represents an abnormal state which can lead to the tripping of the circuit-breaker protecting the supply line. Thus, the pair of electric motors of the electric pump unable to resume the normal operating speed absorbs for a long time a much higher than normal electric intensity, which causes the heating of the coils of the motor or motors and the operation of the protective circuit-breaker of the electric pump. It is then necessary to wait for the coils to have again reached an acceptable temperature in order to manually act on the circuit-breaker in question. An abnormal state of this type can even lead to the destruction of the electric pump motor or motors in the case of repetition.

Thus, the above recently encountered problem has not been solved up to now. Another hitherto unsolved problem is that of starting at very low temperatures (−25 to −45° C.). Under intense cold conditions (up to −40° C.), the mechanical clearances decrease, the viscosity of the fluid increases, together with the friction resulting therefrom, thereby opposing an increased resistance to the normal putting into operation of the electric pump. Therefore the electric pump chokes, which brings about the tripping of the protective circuit-breaker. This situation can be aggravated if the thermal circuit-breaker is also cold, its reaction time being increased.

The object of the invention is to solve these different problems by ensuring the restarting of the electric pump in question following power supply transients, no matter what their origin and duration, whilst allowing a transient overconsumption due to the starting current on energizing the electric pump.

DESCRIPTION OF THE INVENTION

The invention therefore proposes a control device for a mechanism driven by at least one electric motor comprising a circuit for detecting the power consumption of the mechanism and for the comparison of the detected value with a minimum threshold and a maximum threshold in order to establish whether said consumption is outside a given range with confirmation of the result of said comparison during a defined time and a circuit for controlling the stopping of the mechanism for a given time, as a function of the result of said comparison. Advantageously, the current detection thresholds are in the rising current and falling current directions separated by a certain hysteresis.

Advantageously, the device according to the invention also comprises a circuit for detecting the energizing of the mechanism. This mechanism can be an electric pump having two three-phase motors connected in opposition to one another on the same shaft.

In an advantageous embodiment, the power consumption detection circuit comprises current transformers, each traversed by the wires of the same phase. Contactor relays supply the electric pump.

Advantageously, the device according to the invention comprises a circuit for detecting an unbalance between the currents of the three phases.

The power consumption detection circuit and the unbalance detection circuit between the currents of the three phases are connected to current transformers by means of Schottky diodes.

Advantageously, said two circuits are located in the same box. The contactor relays are coils supplied by the same circuit-breaker as the box for the control supply.

The invention has the advantage of preventing any stop in the operation of the electric pump and of ensuring its restarting, no matter what the origin and duration of the power supply transient and also that of requiring no modification to the electric pump, such a modification only occurring at the control. It can therefore be applied to any electric motor type having this problem.

A supplementary advantage is provided by the detection of current overconsumption on the part of the electric pump, independently of the transients. Whilst allowing transient overconsumptions due to starting currents, the invention limits their duration and protects the coils of the motors.

Starting at very low temperatures can be ensures by an automatic sequence of two (or three, as a function of the temperature) successive starts, which bring about the reheating of the electric pump and a normal operation.

The invention can be applied to improving the operation of any electric pump, no matter which fluid or gas is transported or compressed by it, or that of the mechanism driven by an electric motor, whose restarting can be affected by transients, in order to remove it from an abnormal operating state, which may or may not be due to such transients.

The invention can in particular be used in wide-body aircraft equipped with hydraulic circuits, whose pressure is produced by electric pumps.

DETAILED DESCRIPTION OF EMBODIMENTS

Figure 1:
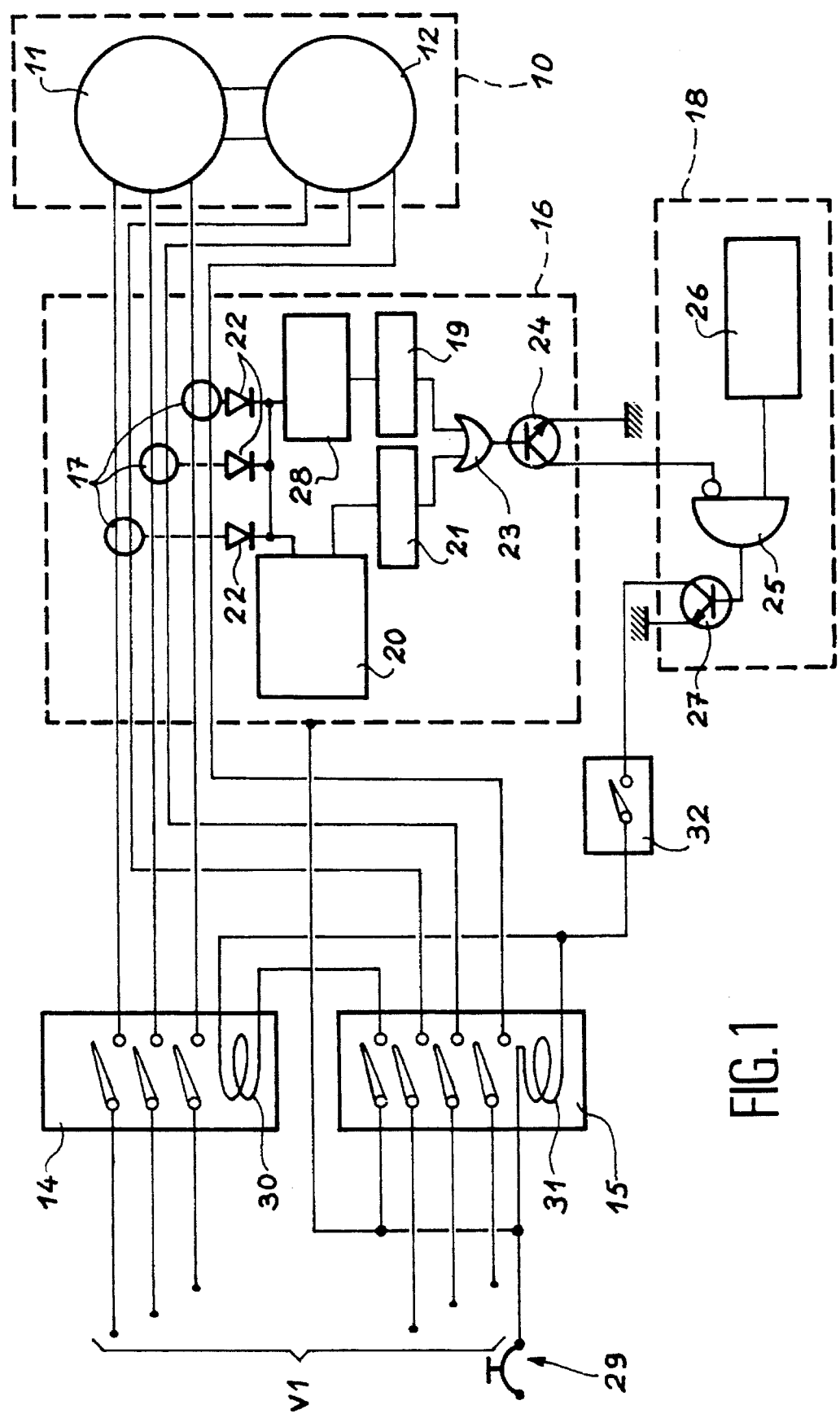
FIGS. 1 and 2 illustrate the device according to the invention.

The invention relates to a control device for a mechanism, e.g. an electric pump, driven by at least one electric motor. Throughout the remainder of the description consideration will be given in exemplified manner to an electric pump.

In the hitherto known devices, such an electric pump is unable to restart following a micro-cutout or transient of its power supply, when the charge opposing the same and which is dependent on the produced pressure/needed flow rate for the equipment used, produces an opposing torque exceeding the motor torque, the latter being a function of the electric pump rotation conditions. The object of the device according to the invention is to permit the restarting of said electric pump, following a power supply transient.

A power supply transient leads to a drop in the consumed current, followed by a rise in said current when the voltage reappears. Any power consumption on the part of the electric pump, below a given threshold, which is below the minimum consumption of the electric pump in normal operation and confirmed for a given time, therefore represents an abnormal operating state on the part of the electric pump.

In the same way, any power consumption on the part of the electric pump exceeding a given threshold, which exceeds the maximum consumption of the electric pump in normal operation and confirmed for a given time, represents an abnormal operation of the electric pump.

Therefore the device according to the invention comprises a circuit for detecting the power consumption of the electric pump and for comparing the detected value with at least one and e.g. two current thresholds and a circuit for controlling the stoppage of the electric pump for a given time, as a function of the result of said comparison.

Advantageously, the device according to the invention also comprises a circuit for detecting the energizing of the electric pump making it possible to bring about in the same way a stoppage for a given time, e.g. 300 ms, of the control of the electric pump for each appearance of the supply of the actual device, which is common to that of the electric pump control logic, in order to provide protection against supply transients of the control (e.g. contactor rebond).

The transparency time value of the power supply of the device (time during which said supply can continue to supply the system although it is no longer supplied itself) is adapted in order to prevent the phenomenon of a maintained starting/stopping/starting sequence and for ensuring the stabilization of the device. In order to do this, in the device according to the invention the current detection thresholds are in the rising current and falling current directions, separated by an adequate current range due to hysteresis.

The device according to the invention brings about a stopping of the control of the electric pump for a given time, e.g. 300 ms, when the power supply current exceeds a given threshold, as a function of the nominal current, for a time defined by extending in this way each power or control transient.

The detection of the power transients cannot be carried out by monitoring the presence or absence of voltage on the power supply line. Thus, this voltage does not drop sufficiently solidly and rapidly to permit an effective reaction to the transients of interest here, i.e. with a duration exceeding 16 ms. This is due to complex transient extra-current choke rejection phenomena. Moreover, the immediate proximity of high currents of the power supply of the electric pump produces radiated electric fields disturbing any low value voltage signal relative to that of the disturbing fields, in particular during the current variations of interest here (starting-stopping).

Therefore the device according to the invention detects a consumption of the electric pump below a minimum value corresponding to a stabilized normal operation by monitoring the intensity of the current consumed by the electric pump by means of current transformers, which generate a signal proportional to the currents passing through it. This value must be confirmed for a given time, which makes it possible to distinguish between a normal starting and an abnormal starting. In the same way, the invention makes it possible to detect a consumption above the maximum value corresponding to a stabilized normal operation by monitoring the intensity of the current consumed by the electric pump, as described hereinbefore. A sufficiently long electric pump stoppage is brought about whenever its consumption is established outside a range adapted to the characteristics of the electric pump for a given time, so as to ensure that it starts normally after the resistant charge due to the residual pressure has decreased sufficiently due to internal leaks.

FIG. 1 illustrates the device according to the invention permitting the control of an electric pump 10. The latter comprises two electric motors 11, 12 supplied by a three-phase power supply or source V1 across two contactor relays 14, 15.

As is known from the prior art devices, an unbalance detection box between the currents of the three phases 16, known as CUDU (Current Unbalanced Detector Unit) having three current transformers 17 respectively traversed by the wires of each phase, supplies a signal to a calculating member 18 in the case of an unbalance between the currents of the three phases.

The reception of this signal by the calculating member 18 authorizes (or prevents in the case of a state change) the control of the contactor relays 14, 15 supplying the electric pump 10 (in the present case these contactors are controlled in cascade in order to distribute in succession the calling currents).

As shown in FIG. 1, the device according to the invention comprises, apart from the circuit 28 for detecting unbalance between the phases, here followed by a latch circuit 19, a transient detection circuit 20 followed by a delay circuit 21, both connected to three current transformers 17 across three diodes 22, which are advantageously Schottky diodes (the use of such diodes is justified by the small level losses which they produce with respect to the signals).

The outputs of the latch and delay circuits 19, 21 respectively are entered in an OR gate 23 followed by a transistor 24. The output signal of said transistor 24 is entered, after inversion within the control member 18, into an AND gate 25, as well as the output of a control logic 26. A transistor 27 is located at the output of said AND gate 25. The output of the transistor 27 is connected to the coils 30, 31 of the contactor relays 14, 15 across a manual switch 32.

When no transients or unbalance are detected between the phases, the signal passing out of the control logic 26 is supplied to the coils 30, 31 of each of the contactors 14, 15. However, when transients or an unbalance between phases are detected, the stopping control signal passing out from the OR gate 23 invalidates the signal passing out of the control logic as a result of the AND gate 25. It is then supplied to the coils 30, 31, thus permitting the opening of the contactors 14, 15 and the stopping of the electric pump 10.

Advantageously the transient detection circuit 20 is introduced into the box 16 so as to be superimposed on the primary function of said box. The electric pump stopping function of the circuits 20, 28 is the same. The coils 30, 31 of the contactor relays 14, 15 are supplied via the same circuit-breaker 29 as the box 16 for the control supply. The assembly 16 completed by the new function provided by the invention can be positioned at any point on the electric pump supply line.

The incorporation of the device according to the invention in an existing equipment, whose function is to monitor a possible current unbalance between three supply phases of the electric pump, makes it unnecessary to modify the existing installation and to use components common to both functions, such as power transformers, so that there are reductions in the weight and costs and an improvement in the overall reliability.

However, the device according to the invention can also be realized independently of the phase unbalance detection function.

The reaction time of the contactor or contactors 14, 15 has no importance for the operation of the device according to the invention, because the time for passing into the inoperative state is subtracted from that of passing into the operative state, which are very similar.

The principle of the invention is independent of the electric pump control mode. In particular, as it only occurs downstream of the control logic located in the control member 18, the state of the output signal of the box 16 modified by the invention does not affect that of a possible automatic control operation of the electric pump.

Figure 2:
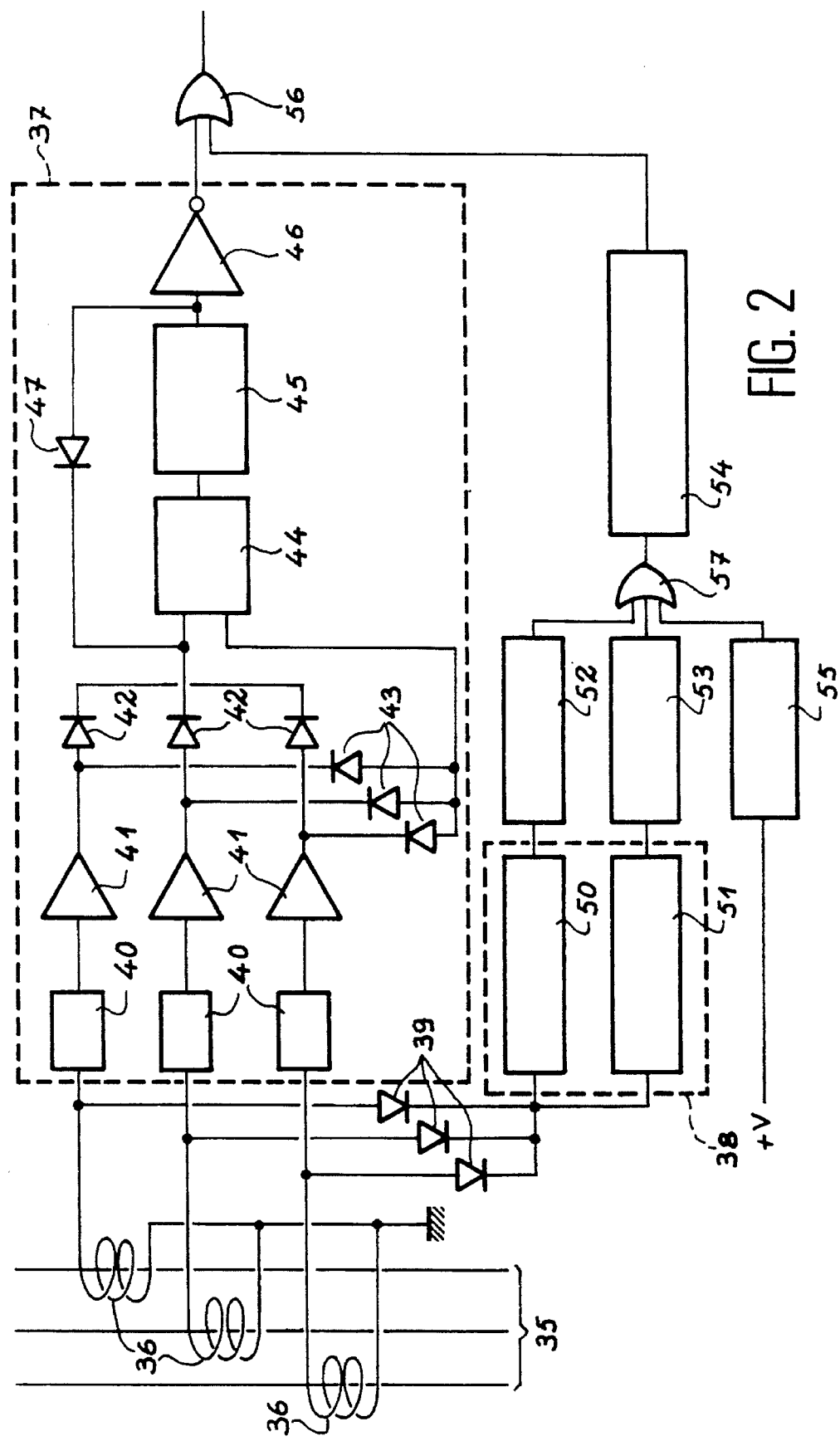

FIG. 2 more specifically illustrates block 16 in FIG. 1. The electric pump power supply is illustrated in the form of three conductors 35, which pass through the coils of the current transformers 36. The latter are connected on the one hand to the circuit 37 for detecting unbalance between phases and on the other to the circuit 38 for detecting current consumption across three diodes 39.

The circuit 37 for detecting unbalance between phases comprises three channels each having a filter 40 followed by an amplifier 41 and two diodes, one in the conductive direction 42 and the other in the reverse direction 43. The outputs of these diodes 42, 43 are respectively connected to the two inputs of a threshold detector 44, followed by a timing circuit 45 and an inverter 46, one diode 47 being connected between the output of the timing circuit 45 and one of the inputs of the threshold detector 44.

The current consumption detection circuit 38 comprises a circuit 50 for checking or monitoring the current signal at the common point downstream of the three diodes 39, with respect to overcurrents and a circuit 51 for checking or monitoring said same current signal with respect to possible undercurrents.

Each of these two circuits 50 or 51 is followed by a circuit 52 or 53 for checking the duration of these abnormal conditions (overcurrents or undercurrents), whose output is connected to an OR gate 57, whose output is connected to a circuit 54 for controlling the interruption of the output signal during a square-wave pulse of given duration. An energization detection circuit 55 is also connected to the OR gate 57 connected to the circuit 54. The output of the circuit, as well as that of the inverter 46, are entered into an OR gate 56 supplying the electric pump operation authorization signal.

Thus, the conductors 35 traverse the coils of the current transformers 36 and in each case generate a current signal, when the electric pump is supplied (one signal per supply phase). These three signals are superimposed and rectified across three diodes 39, advantageously of the Schottky type, and are distributed to two monitoring circuits 50, 51.

The two assemblies 50, 52 and 51, 53 are constituted by comparators, which check the current signal at the common point downstream of the three diodes 39 and which check the duration of a possible abnormal condition (overcurrent or undercurrent) and compare them with thresholds incorporated therein. When the thresholds are exceeded, these assemblies activate the circuit 54 and the output changes state for a given time, e.g. 300 ms, preventing the operation of the electric pump. Beyond 300 ms, the output signal reassumes its initial state and again authorizes the control of the pump.

The energization detection circuit 55, associated with the circuit interrupting the output signal for a 300 ms square-wave pulse, generates a square-wave pulse of e.g. 300 ms on energizing the system and whenever a transient of its own power supply exceeds its transparency time, thus bringing about the stoppage of the control of the electric pump and protecting it against an unsatisfactory restarting for this type of transient.

The OR gate 56 receiving the output of the interruption control circuit 54 and the output of the transient detection function inverter 46 makes it possible to use in common the same output because the aim of stopping the electric pump is common. It is pointed out that the phase unbalance detection function has a locked output, but this has no affect for the new functions, because the latch circuit 19 is located upstream of the output placing in common OR gate.

The device according to the invention can also have other advantageous characteristics:

the appropriate definition of a power supply transparency time common to the device and to the control of the electric pump power supply contactor makes it possible to obtain freedom from transients affecting this supply, the determination of an adapted hysteresis between the increasing and decreasing current thresholds is necessary for the correct operation of the invention, the fact of causing the stoppage of the electric pump for a sufficient time to enable internal leaks of the supplied circuit to lower the pressure in said circuit and therefore lower the opposing torque, makes it possible to guarantee the correct restarting of the electric pump.

The following values were obtained in a test performed in the laboratory:

| Electrical characteristics of the electric pump | |
| --- | --- |
| Nominal current | 35 to 70 amperes (min to max charge) |
| Supply voltage V1 | 115 V, 400 Hz, three-phase |
| Operating temperature | −40 to +110° C. |
| Starting current | 170 amperes for 200 ms at 20° C., 170 amperes for 2 s at −25° C. |

| Electrical characteristics of the device according to the invention | |
| --- | --- |
| Power supply transient detection function | |
| Rising alternating current threshold | 20 amperes r.m.s. +/− 2.5 A |
| Decreasing alternating current threshold | 15 amperes r.m.s. +/− 2.5 A |
| Minimum hysteresis | 4 amperes r.m.s. |

Transient confirmation before triggering pump stoppage: 16 ms from 35 to 70 A.

Device power supply transparency time: 20 ms +/−3 ms (This transparency time is substituted for the transient confirmation of the device power supply transient detection function).

Electric pump overconsumption detection function: Increasing alternating current detection threshold:

90 amperes +/−5 A

Confirmation of exceeding this threshold for 2.5 seconds Timing the restarting after confirmed detection:

300 ms (+100 ms; −25 ms).

Thus, the device according to the invention makes it possible to detect power supply transients and then bring about a forced stoppage of the electric pump control. The control is automatically reactivated 300 ms after the end of the transient, thus permitting a correct restarting of the electric pump, no matter what the charge which was previously applied thereto (said charge being variable as a function of the flow rate requirement of the supplied equipments).

Beyond a 200 ms interruption of its power supply, the electric pump restarts correctly. Therefore the transients considered are below 200 ms. Interruption of operation for (200+300)=500 ms is acceptable by the system and is in all cases preferable to the loss of operation of the electric pump for the entire flight taking place.

I claim:

1. Device for controlling an electric pump which comprises two electric motors supplied by a three-phase power supply across two contactor relays, said device comprising a circuit for detecting the current consumption of the electric pump and for comparing the detected value with a minimum current threshold and a maximum current threshold for determining whether said consumption is outside a predetermined range, with confirmation of the result of said comparison for a defined time; a circuit for controlling the stoppage of the electric pump for a predetermined time, as a function of the result of said comparison;

a circuit for detecting the energizing of the electric pump to bring about a stoppage for a given time of the control of the electric pump for each appearance of the supply of said device, in order to provide protection against supply transients of the control or power supply;

an unbalance current detection circuit for detecting unbalance between the currents of the three phases of said three-phase power supply, said unbalance detection circuit having three current transformers respectively traversed by the wires of each phase; a calculating member coupled to said unbalance detection circuit and receiving a signal therefrom in the case of an unbalance between the currents of the three phases; and a transient detection circuit connected to three current transformers across three diodes, whereby when transients or an unbalance between phases are detected, a stopping control signal is generated to control the stopping of the electric pump.

2. Device according to claim 1, wherein the current detection thresholds are in the rising current and falling current directions, separated by a current range hysteresis.

3. Device according to claim 1 also comprising a circuit for detecting the energizing of the electric pump.

4. Device according to claim 1, wherein said electric pump has said two three-phase motors connected in opposition to one another on the same axis.

5. Device according to claim 1, wherein the current consumption detection circuit comprises current transformers in each case traversed by the wires of the same phase.

6. Device according to claim 5 comprising said contactor relays having coils traversed by current from a current supply for said mechanism.

7. Device according to claim 6, wherein said current consumption detection circuit includes an unbalance detection circuit for detecting the unbalance between the currents of the three phases and wherein a single circuit breaker is provided between said current supply, said coils of said contactor relays and said unbalance detection circuit.

8. Device according to claim 1 including a transient detection circuit and wherein said transient detection circuit and the circuit for detecting an unbalance between the currents of the three phases are connected to current transformers by means of three Schottky diodes.

9. Device according to claim 8, wherein said transient detection and unbalance detection circuits are located in the same box.

10. Device according to claim 1 wherein said current consumption detecting circuit detects the current of electric pumps used in wide-body or large-capacity aircraft equipped with hydraulic circuits.

11. Device according to claim 1, wherein said two electric motors can stop and restart said electric pump at extreme low temperatures.

12. Device according to claim 11, wherein said low temperature is in the order of 40°.

* * * * *